United States Patent [19]
Barbe et al.

[11] Patent Number: 5,248,169
[45] Date of Patent: Sep. 28, 1993

[54] COMPOSITE PIPE COUPLING SLEEVE

[75] Inventors: Pierre Barbe, Toul; Vincent Mignet, Blenod les Pont-a-Mousson; Serge Renard, Pont-A-Mousson, all of France

[73] Assignee: Pont-A-Mousson S.A., Nancy, France

[21] Appl. No.: 829,258

[22] Filed: Feb. 3, 1992

[30] Foreign Application Priority Data

Feb. 4, 1991 [FR] France ................... 91 01350

[51] Int. Cl.$^5$ ............... F16L 17/00; F16L 21/00; F16L 33/16
[52] U.S. Cl. .................... 285/110; 285/235; 285/369
[58] Field of Search .......... 285/110, 235, 237, 369, 285/408

[56] References Cited

U.S. PATENT DOCUMENTS

| | | | |
|---|---|---|---|
| 3,430,989 | 3/1969 | Wendt | 285/235 |
| 4,616,858 | 10/1986 | Sauer | 285/235 |
| 4,726,611 | 2/1988 | Sauer | 285/110 |

FOREIGN PATENT DOCUMENTS

| | | | |
|---|---|---|---|
| 1132394 | 6/1962 | Fed. Rep. of Germany | 285/110 |
| 2153064 | 5/1973 | Fed. Rep. of Germany | 285/110 |
| 980901 | 1/1965 | United Kingdom | 285/110 |

*Primary Examiner*—Neill R. Wilson
*Attorney, Agent, or Firm*—Sughrue, Mion, Zinn, Macpeak and Seas

[57] ABSTRACT

A composite sleeve A serves as an impermeable coupling between pipes T1 and T2 having smooth, uniform ends. The sleeve comprises a rigid binding ring B acting as a jacket for a flexible, elastic and reversible collar C, which is attached to the binding ring by a pair of toric retaining rings D which press the collar C internally against the binding ring at zones of contact 13 in proximity to the ends of the binding ring, while creating, between the contact zones, an annular space 14 between the collar and the binding ring. The coupling connects collection pipes used for gravitational sanitary drainage, and is impervious to internal and external pressures.

12 Claims, 4 Drawing Sheets

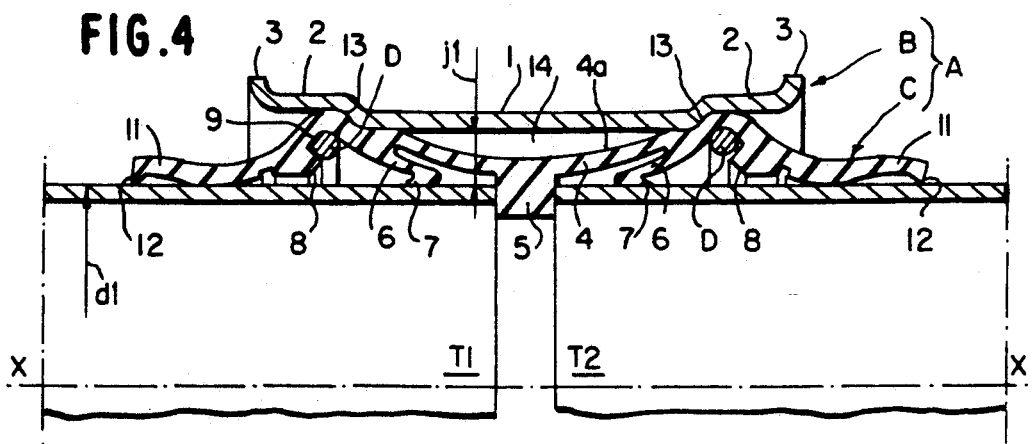
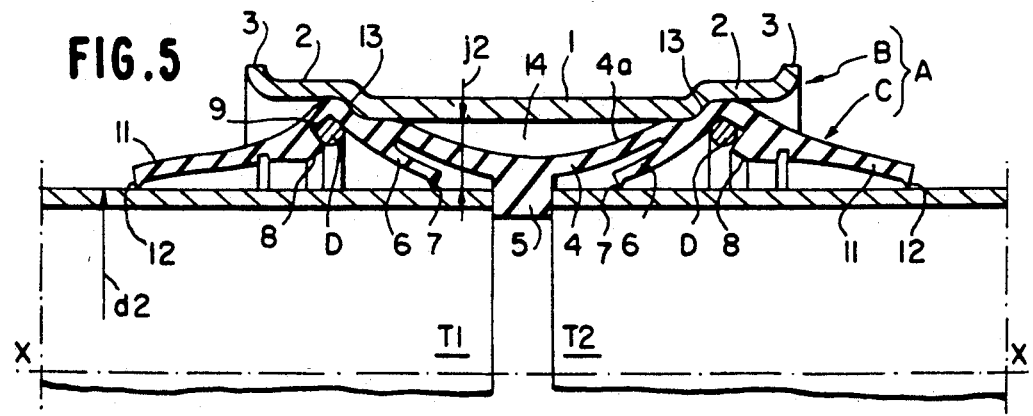
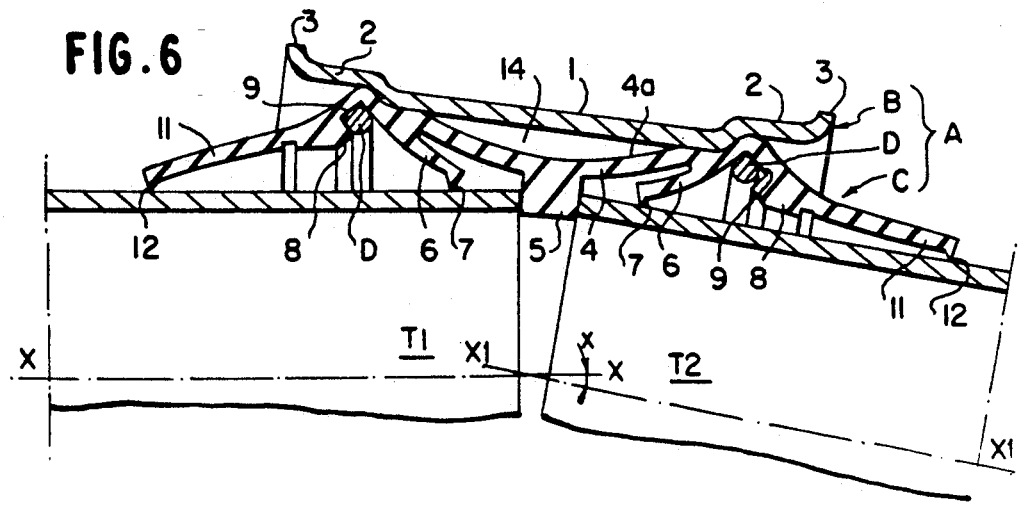

COMPOSITE PIPE COUPLING SLEEVE

BACKGROUND OF THE INVENTION

The invention concerns a composite sleeve comprising elements attached together, designed for the creation of a sealing joint for the connection of ducts used for gravitational sanitary drainage. More specifically, it concerns a sleeve for the impermeable assembly of uniform ends of pipes whose outer surfaces are in the rough, non-machined state, these pipes being made of a fiber-cement, cast iron, or any other suitable material.

The composite sleeve and the sealing joint incorporating it are designed to ensure imperviousness to pressures which may range up to approximately 2 bars, while incorporating wide outer diametral tolerances of the uniform ends of the assembled pipes. The sleeve and the joint also allow angular deviation of one pipe in relation to the other.

Patent No. FR 1 439 234 discloses an angularly-deviated composite pipe assembly incorporating diametral tolerances of the two uniform ends of the pipes. In this composite sleeve, a collar comprising thin, flexible, elastic end lips is enclosed in a rigid binding ring whose ends are folded inwardly at right angles, i.e., toward the axis. This assembly is impervious to the internal pressure of the liquid in the duct, which tends to press the thin lips on the pipes, but not to the external pressure of a liquid capable of lifting and pushing each lip away from the smooth end on which it is elastically pressed.

Patent FR 2 444 864 also discloses a composite sleeve for the impervious connection of two fiber-cement pipes, which allows wide outer diametral tolerances and angular deviations of the pipes and provides imperviousness to both external and internal pressure. The composite sleeve is produced by welding two sealing gaskets to the ends of a rigid tubular element or connection sleeve. Welding requires the use of specified materials, in this instance a polyolefin used for the tubular element or sleeve, and EPDM rubber for the sealing gaskets, because of their suitability for welding. The sealing gaskets comprise a single lip incorporating an end flange containing, in its core, an elastic band which tightens over the smooth ends of the pipes.

SUMMARY OF THE INVENTION

Applicant has set itself the problem of attaching the components of the composite sleeve without welds, thus allowing a degree of latitude in the choice of the materials, and without enclosing a flexible collar in a rigid binding ring, in order not to limit the diametral tolerances on the pipes or the possibilities for angular pivoting.

An object of this invention is thus to provide a composite sleeve which solves this problem. This composite sleeve comprises a rigid outer binding ring having axis X—X and a flexible, elastic and reversible sealing collar having axis X—X, housed inside the binding ring which encloses it, and fitted with a median circular projection intended to act as a stop between the smooth ends of the pipes to be connected. The flexible, elastic collar is attached to the rigid binding ring by a pair of toric retaining rings which press the collar internally against the binding ring at zones of contact in proximity to the ends of the binding ring, while creating, between the zones of contact, an annular space located between the collar and the binding ring.

The composite sleeve according to the invention also solves the problem of increasing the diametral tolerances of the pipes to be connected beyond the tolerance level allowed by the flexibility of the thin lips alone of a sealing gasket. These supplementary diametral tolerances are provided by the annular space between the flexible sealing collar and the rigid binding ring constituting the composite sleeve according to the invention.

Another problem consists in imparting to the flexible, elastic collar, which must provide sealing of the connection of the pipes by means of the composite sleeve, multiple capabilities such as ease of unmolding in the free-standing state, fitting of the pipes together without stress, and impermeability, without rendering the shapes of the collar more complex.

This problem is solved by the design of the composite sleeve and its collar, and by a process of making and using the composite sleeve, which consists in successive phases involving turning the free-standing collar completely inside out and folding it down inside the binding ring. The collar lends itself to these deformations because of its reversibility.

Finally, the invention concerns a sealing joint made using the composite sleeve and by means of the aforementioned process.

BRIEF DESCRIPTION OF THE DRAWINGS

FIG. 4 is a partial cross-section of a sealing joint formed by the assembly of the pipes aligned inside the composite sleeve shown in FIG. 3, for a maximum diameter of the pipes;

FIG. 5 is a view, analogous to that in FIG. 4, of the sealing joint produced for pipes having a minimum diameter;

FIG. 6 is a partial cross-section, corresponding to FIGS. 4 and 5, of the sealing joint created for pipes exhibiting an angular deviation;

DETAILED DESCRIPTION OF THE PREFERRED EMBODIMENTS

Figure 1:
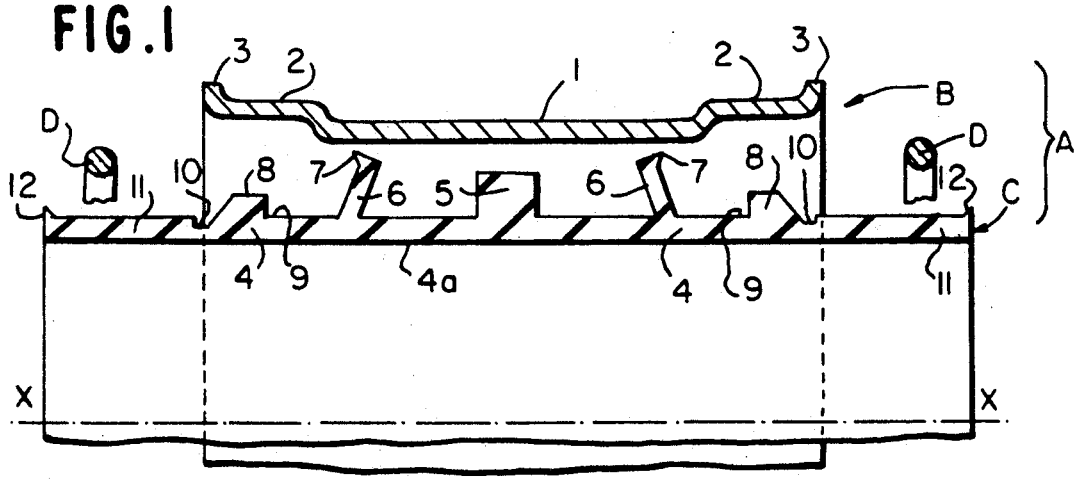
FIG. 1 is a partial median cross-section of different components, shown separate from each other, comprising a composite sleeve according to the invention, i.e., a rigid binding ring, a flexible collar, and a pair of toric retaining rings.

In accordance with the embodiment in FIG. 1, a composite sleeve A according to the invention is composed of a rigid tubular element, or binding ring B, a flexible, elastic sealing collar C, and a pair of toric retaining locking rings D.

The binding ring B, which has the axis X—X, is made of a rigid plastic material, e.g., polyethylene. It comprises a tubular body 1 having at its ends two extensions 2 whose internal diameters are greater than that of the tubular body 1. The integral extensions flare outwardly into flanges, or mouth pieces 3.

Instead of plastic material, the binding ring B may also be made of a fiber-cement material or sheet steel coated with an anti-corrosion layer, for example an epoxy resin.

The flexible, elastic sealing collar C is made of an elastomer, for example a rubber elastomer having a SHORE hardness of approximately 57 or 58 A. It is thin in relation to its diameter and can thus be turned inside out or everted, thereby giving it its final name, "reversible collar". Its length is substantially greater than that of the binding ring B, and it corresponds to the sum of the length of the binding ring B and of the lengths of the two extensions 2.

Figure 2:
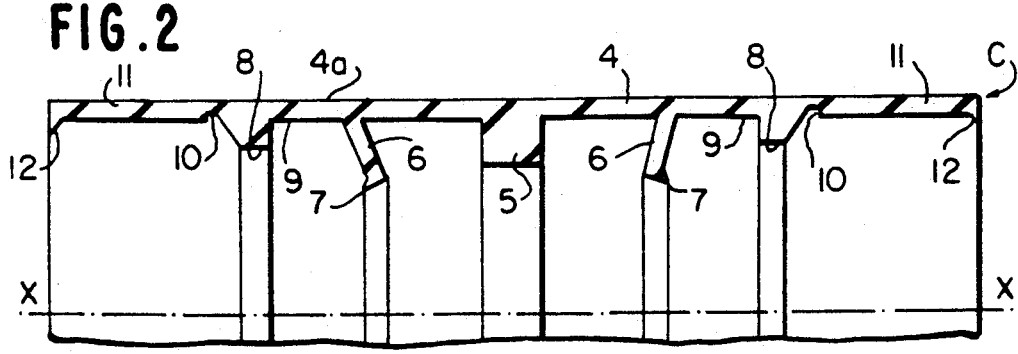
FIG. 2 is a partial cross-section of the flexible, elastic collar in FIG. 1, turned completely inside out or everted to allow its assembly in order to create the composite sleeve.

The collar C may be molded directly into a shape ready for use, as shown in FIG. 2; however, for reasons of convenience, and, in particular, for ease of molding, the collar will preferably define, independently and when leaving the mold, the shape described below with reference to FIG. 1.

Its tubular body 4 having axis X—X has a smooth inner cylindrical surface 4a and an outer surface defining a number of projections or protuberances. In the middle, the tubular body 4 comprises a thick radial projection 5 having a median square or rectangular section designed to form a stop for the pipes to be connected.

When fastened to the binding ring B (FIG. 3), the collar C is internally equipped, in symmetrical fashion on either side of the median stop 5, with an annular tapered sealing lip 6 converging toward the axis X—X and the median stop 5; with a trapezoidal projection 8 having a median rectangular trapezoid-shaped section which creates, by means of its right-angled side and in conjunction with the tubular body 4, a groove 9 which houses a toric retaining ring D; next, at the base of the diagonal side of the trapezoidal projection 8 and toward the end, with a circular groove 10; and finally, with a long flexible, annular sealing lip 11 which merges with the tubular body 4. The sealing lips 6 and 11 end in circular crests or tips, 7 and 12 respectively, designed to be pressed on the outer surfaces of the pipes to be connected.

Figure 3:
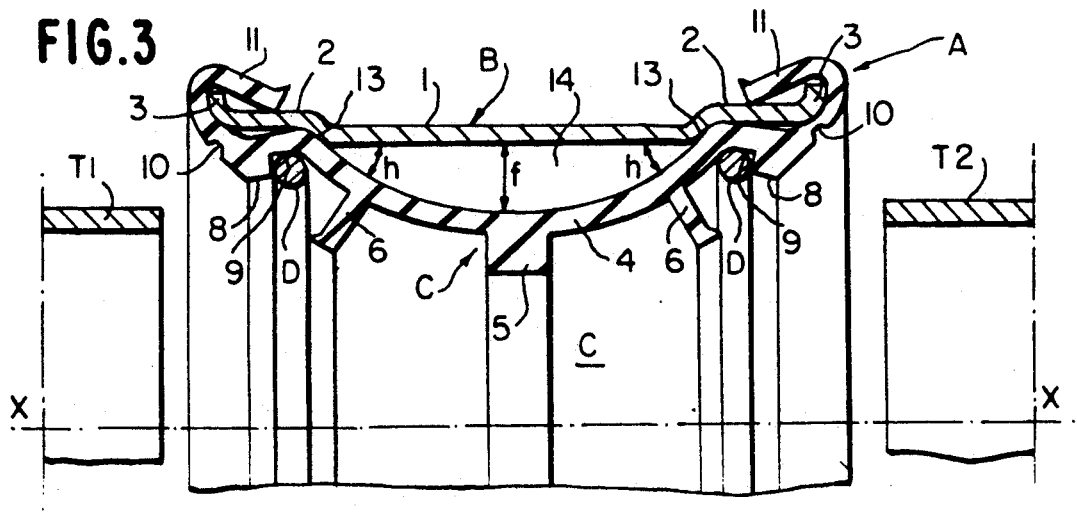
FIG. 3 is a partial cross-section of the composite sleeve in FIG. 1, after assembly of the different elements but before the pipes to be connected are fitted together.

The process for making and using the composite sleeve A, as illustrated in FIGS. 2 and 3, consists in molding a flexible, reversible collar C whose tubular body 4 incorporates a smooth inner surface 4a and outer stop projections or protuberances 5, sealing projections 6 and 11, and trapezoidal projections 8, then in everting the collar so that its smooth inner surface becomes the outer surface and so that the projections, or protuberances, 5, 6, 11, and 8, which were outer projections when the collar was removed from the mold (not shown) (FIG. 1) become inner projections (FIG. 2). The everted flexible collar C is then inserted coaxially inside the rigid binding ring B (FIG. 3), and after axial alignment of the pipes T1 and T2 to be connected and before they are fitted into the composite sleeve A, the ends of the long flexible sealing lips 11 are folded down over the flanges 3 and extensions 2 of the binding ring B on the outside, so as to cover them and to form a better axial attachment between the collar C and the binding ring B, and so as to create flared inlets in the composite sleeve A, thus facilitating the jointing of the pipes T1 and T2. The deformation and flexibility of the sealing lips 11 are facilitated by the circular groove 10 located between each trapezoidal projection 8 and each long end lip 11, an arrangement which promotes the flexibility of the collar. To improve the attachment of the collar C to the binding ring B, each toric retaining ring D, whose outer diameter corresponds to the inner diameter of each extension 2 reduced by twice the thickness of the tubular body 4, is then inserted in each groove 9 between each annular trapezoidal projection 8 and the tubular body 4 of the collar, so as to press the collar against the bottoms of the extensions 2 of the binding ring B in the areas of contact 13.

The tubular body 4 then adopts, in median section, a curved shape extending toward the axis X—X of the collar C or an arched shape having a maximum radial deflection f in a straight line with the median stop; it thus creates, in conjunction with the binding ring B, an annular space 14 delimited by the contact zones 13. The curvature of the tubular body contributes to keeping the collar C and the binding ring B tightened in position, in conjunction with the retaining rings D.

It is also possible to mold a collar C whose tubular body 4 has a pronounced curvature in relation to the axis X—X of the collar.

It should be noted that a radial space having a radial height h between the tubular body 4 and the binding ring B is formed in a straight line continuing from the beginning of each tapered lip 6. As will be explained below, this radial or annular space is designed to provide an additional diametral tolerance for the pipes, beyond the tolerance furnished by the flexibility of the sealing lips 6 and 11 alone. Furthermore, the curved or arc shape in the median section of the tubular body 4 promotes a subsequent elastic pressing of the sealing lips on the connected pipes.

To connect two pipes T1 and T2 (FIGS. 3 and 4), made, for example, of a fibrous-cement material or cast iron and incorporating smooth, even ends but in a rough, non-machined condition, the collar C is locked axially in place on the binding ring B. Any axial movement of the collar C in relation to the binding ring B is rendered impossible, in particular during the joining of the pipes, which may be components of a sanitary drainage duct.

To allow the pipes T1 and T2 to be fitted or inserted into the composite sleeve A without stress, the long sealing lips 11, which are folded over the flanges 3 and extensions 2, provide a flared inlet having a minimum inner diameter substantially greater than the outer diameter d1 or d2 of each pipe end.

As regards the tapered lips 6 which had converged toward each other and toward the median stop 5 on the collar C in the freestanding state (FIG. 2), they now diverge and oppose each pipe T1 and T2 as a kind of barrier which will be crossed.

Because the pipes are aligned along the axis X—X of the composite sleeve A, each end of the pipes is inserted axially without stress and freely crosses the threshold of each trapezoidal projection 8 whose minimum inner diameter is greater than the outer diameter of the pipe.

As the pipes T1 and T2 are fitted together, each one reaches and pushes back each tapered lip 6 and crosses it while depressing it toward the median stop 5, thereby moving it closer to the tubular body 4. The tip 7 at the end of each lip 6 is then pressed on the outer surface of the pipe with a certain degree of elastic clamping action and pressure.

The stop 5 halts the inward progress of each pipe T1 or T2. The curved or arc-shaped tubular body 4 has moved closer to the tubular body of the binding ring B. The volume of the variable annular space 14 has diminished. The radial space having height h in a straight line with the origin of each lip 6 has been eliminated because each zone of contact 13 has been enlarged. The maximum deflection f of the tubular body 4 in a straight line with the median stop 5 has also grown smaller.

To complete the sealing joint after the pipes T1 and T2 have been fitted together until they abut against the median stop 5 (FIG. 4), each end, or long sealing lip (11) belonging to the collar C is once again folded back towards the axis X—X so as to be separated from the binding ring B and to be pressed on the outer smooth, even surface of each pipe.

As is the case for the tips 7, the tip 12 of each long lip 11, which extends along each pipe, is pressed on the outer surface of the pipe while exerting a certain clamping action and is slightly crushed.

The tapered sealing lips 6 converge toward the axis X—X of the composite sleeve A and toward the median stop 5, while the long lips 11 extend along the ends of the pipes T1 and T2 as they converge toward the axis X—X and toward each end of the composite sleeve A, in such a way that each sealing lip 6 and each long sealing lip 11 in conjunction form an inverted V-shaped median section whose spacing is variable in contact with the pipes, according to their diametral tolerances.

The sealing joint produced between the composite sleeve A and the smooth, even ends of the pipes T1 and T2, of the type in which the ends of the attached pipes abut against the median stop 5 and in which the sealing lips 6 and 11 press against the outer surfaces of the pipes, is such that the flexible collar C attached to the binding ring B in order to form the composite sleeve A creates, in conjunction with the binding ring B, an annular space 14 having a variable volume depending on the diametral tolerances of the ends of the pipes. The toric retaining rings D which attach the flexible collar C to the rigid binding ring B are confined in grooves 9 created between the trapezoidal projections 8 and the tubular body 4 of the collar C, and they press the collar against the bottoms of the extensions 2 of the binding ring B in contact zones 13 which delimit the annular space 14, the tubular body 4 of the collar C curving toward the axis X—X of the composite sleeve A between these contact zones 13.

In this sealing joint, the tapered lips 6 provide imperviousness to internal pressure in the pipe duct. In fact, the internal pressure of the liquid conveyed tends to press the lips 6 more forcefully on the outer surfaces of the pipes. The long lips 11 provide imperviousness to the external pressure of any liquid, and prevent it from penetrating into the space between the sleeve A and each pipe, i.e., the space between the lips 6 and 11 and each pipe. It proves all the more impossible for any external liquid to mix with the internal liquid transported in the pipes. Indeed, external pressure tends to press the long lips 11 more forcefully on the outer surfaces of the pipes.

This composite connection sleeve A allows wide tolerances in the outer diameters of the connected pipes. Thus, in accordance with FIG. 4, the sealing joint is produced in conjunction with pipes having a maximum outer diameter d1. Diameter d1 corresponds to a minimum radial play j1 between the outer surface of a pipe and the inner surface of the tubular body 1 of the binding ring B. The volume of the annular space 14 is minimal. In FIG. 5, on the other hand, the sealing joint is formed in conjunction with pipes having a minimum outer diameter d2. Diameter d2 corresponds to a maximum radial play j2 between the outer surface of a pipe and the inner surface of the tubular body of the binding ring B. The volume of the annular space 14 is maximal.

Comparing once again FIGS. 4 and 5, it can be seen that the sealing lips 6 and 11 do not lie on the pipes in as pronounced a manner in FIG. 5, and that the inverted V formed by the lips 6 and 11 tends to incorporate a smaller spacing than in FIG. 4.

Comparing FIG. 3, illustrating the composite sleeve A before creation of the sealing joint, with FIGS. 4 and 5, illustrating the joint, it is found that the reduction to zero of the radial space having height h between body 4 and body 1 in a straight line with each lip 6 confers an additional diametral tolerance which is added to that imparted by the flexibility of the sealing lips 6 and 11. The result is a significant total diametral tolerance for pipes T1 and T2, while preserving imperviousness to internal and external pressures, which may equal approximately 2 bars.

Another advantage of the composite sleeve according to the invention lies in the ease with which the attached pipes can be adapted to angular deviations. Thus, in the example of FIG. 6, the pipe T2 has an axis X1—X1 deviated by an angle x in relation to axis X—X of pipe T1. The composite sleeve A easily adjusts to conform to this deviation. The median stop 5 separates the pipes T1 and T2, while being crushed more on one portion of its periphery than on the other. The sealing lips 6 and 11 remain pressed on the pipes T1 and T2 with a certain elastic clamping force.

The maximum value of angle x, which is approximately 10°, is limited more by the diameter of the pipes, whose end sections can almost come into contact with each other, than by the composite sleeve A, whose flexible collar C exhibits significant deformability and creates a sizable radial space 14 in conjunction with the binding ring B.

Other advantages resulting from this embodiment are as follows:

Because of the reversibility of the collar C, it can be molded in the position illustrated in FIG. 1 between a cylindrical mandrel, or inner core (interior surface 4a) and an outer mold, and can be easily unmolded by first removing the cylindrical core and then by separating the collar C from the exterior mold. It is in the everted position illustrated in FIG. 2 that the collar C in joined with the binding ring B so as to create the composite sleeve A.

The composite sleeve A is formed using simple, economical means, because of the characteristics of its components B, C, and D.

The annular space 14 and the arc-shaped form of the median section of the collar C increase the diametral tolerance already imparted by the flexibility of the sealing lips 6 and 11.

The rigid binding ring B of the sleeve A conforms easily to the angular deviation incorporating an angle x between the pipes T1, T2 as a result of its attachment to the collar C, because of the toric retaining rings D, which are firmly held in position in each groove 9 between each trapezoidal projection 8 and the tubular body 4.

Finally, the sealing joint proves effective in countering both internal and external pressure, because of the positioning of the sealing lips 6 and 11, which form a median section having a kind of inverted V pressed against the pipes, which have been fitted into each other without stress.

To facilitate the installation of the composite sleeve at a work site it may prove advantageous, in some cases, to avoid the assembly operation of the sealing joint consisting, first, in folding back the long sealing lips 11 of the collar C over the flanges 3 and extensions 2 of the binding ring B, and then, in a second stage, lowering the long lips 11 on the smooth outer surface of the connected pipes, while preserving the proper degree of imperviousness to both internal and external pressures. It will then be possible to implement any of the variants in FIGS. 7 to 10, in which the composite sleeve A is fitted with a channelling means allowing external liquids to penetrate into the annular space 14, an arrangement which, as will be described below, meets the concerns stated.

The composite sleeve A (FIGS. 7 to 9 and 10) is configured such that the collar C, when attached to the binding ring B, is fitted internally and symmetrically on either side of the median stop 5, with an annular sealing lip 6 which converges toward the axis X—X and toward the median stop, and with a trapezoidal projection 8 having a median section shaped like a rectangular trapezoid which creates, by means of its right-angled side and in conjunction with the tubular body 4 of the collar C, a groove 9 housing a retaining ring D, the trapezoidal projection 8 being extended to the inside of the collar by a protuberance forming a flexible radial or tapered protective annular ring 15. When the sealing joint between a composite sleeve A according to any of these variants and the smooth, even ends of the pipes T1 and T2 is created, the protective lips 15 are pressed against the outer surfaces of the connected pipes and converge toward the axis X—X and toward the median stop 5 of the collar. The lips 15 prevent the penetration of solid particles, such as filling material or grains of sand, for example, inside the sleeve and are impermeable to external liquids at low pressures which do not exceed approximately 0.3 bar; however, these protective lips are not impermeable to external liquids at higher pressures. Furthermore, because of their flexibility, these lips 15 in no way hinder the joining of the pipes to be connected.

The materials making up the components of the composite sleeve A according to either of these two variants are of the same type as those used to make the composite sleeve according to the embodiment of FIGS. 1 to 6. Similarly, to install the composite sleeve according to these two variants and for the creation of the sealing joint, a procedure analogous to that described for the embodiment of FIGS. 1 to 6 is carried out, except as regards the operations relating to the long sealing lips 11, which have been eliminated.

Figure 7:
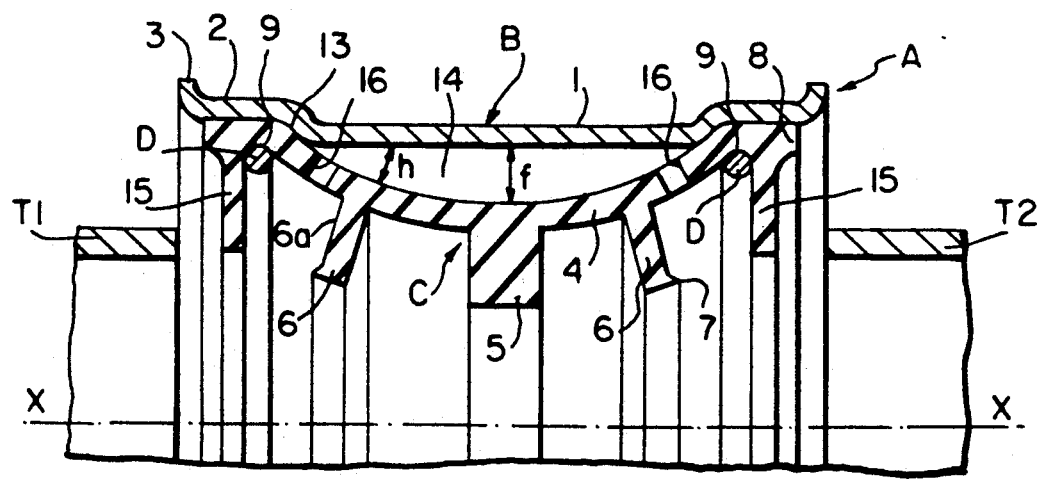
FIG. 7 is a view analogous to that in FIG. 3, according to a second embodiment of the invention.
Figure 8:
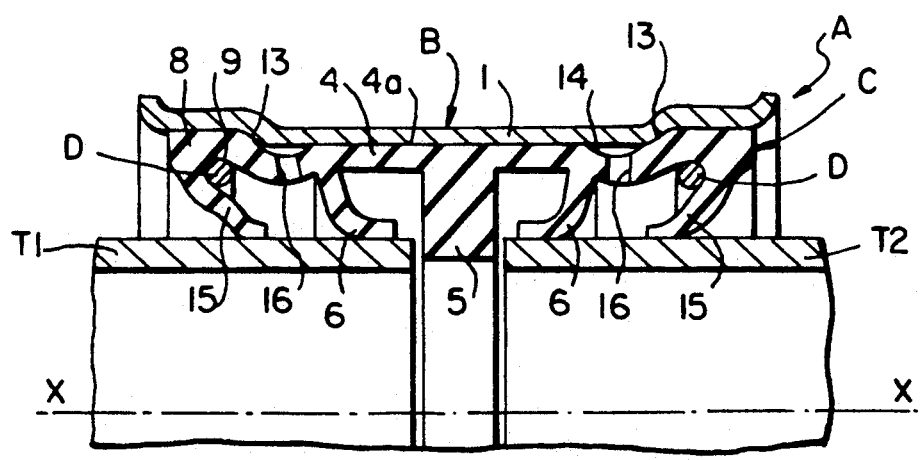
FIG. 8 is a partial cross-section of a sealing joint formed by the assembly of two pipes aligned inside the composite sleeve illustrated in FIG. 7, this joint being subjected to the internal pressure of a liquid contained in the duct.
Figure 9:
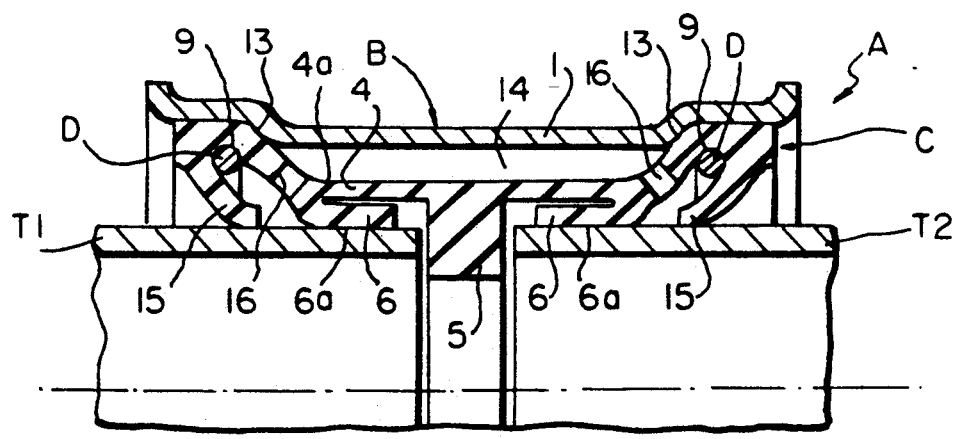
FIG. 9 is a view analogous to that in FIG. 8, the sealing joint being subjected to an external fluid pressure.

In the embodiment of FIGS. 7 to 9, the rigid ring B is identical to that in FIG. 1, and the channelling means incorporated into the composite sleeve A is formed by at least one orifice 16 passing through the tubular body 4 of the collar, the orifice being positioned between a groove 9 in the collar and the tapered sealing lip 6 in immediate proximity to the groove. The channelling means is preferably formed, on either side of the median stop 5, by a series of orifices 16 arranged around the periphery of the collar C. This arrangement makes it possible to dispense with the use of the long annular sealing lips 11, such as those illustrated in FIGS. 1 to 6, in order to provide imperviousness to the external pressure of a fluid; it also offers the advantage of assigning to the tapered annular sealing lips 6 alone all of the functions ensuring imperviousness to inner and outer fluid pressures.

In fact, in the case of a sealing joint subjected to internal pressure within the duct T1-T2 (FIG. 8), the liquid being transported tends to press the sealing lips 6 more forcefully against the outer surfaces of the pipes and to push the tubular body 4 of the collar back toward the inner surface of the ring B until, in cases of extreme internal pressures, contact is obtained between the central part of the smooth cylindrical surface 4a of the collar C and the inner surface of the tubular body 1 of the ring B, the volume of the annular space 14 then being reduced in consequence.

Furthermore, in the case of a sealing joint subjected to an external liquid pressure (FIG. 9) whose value is such that the protective lips 15 and no longer impermeable to it, the liquid can penetrate freely into the space between the lips 6 and 15 and each pipe T1, T2, and then through the orifices 16 into the annular space 14 until it completely fills its volume. At this stage, the force generated inside the annular space 14 by the pressure of the liquid pushes the tubular body 4 toward the inside of the sleeve A, thereby moving its elements adjoining the median stop 5, in particular, into contact with the outer surface of the attached pipes T1, T2. At the same time, the tubular body 4 pushes on the sealing lips 6, which converge toward the axis X—X and toward the median stop, which are compressed still more forcefully against the outer surface of the pipes, thereby increasing the imperviousness of these lips 6 to the external pressure of the liquid.

This effect is made possible by the fact that the smooth surface 4a of the tubular body 4 of the collar C is much larger than the surface 6a of the lips 6 which is outermost to the sleeve, thereby attributing greater importance to the force of application of the collar C on the connected pipes, and thus, the compression of the lips 6 on the pipes, this force being generated by the presence of pressurized fluid in the annular space 14 which exerts pressure on the smooth surface 4a, this force being generated to the detriment of the force induced by the pressure of the liquid in the space between the lips 15 and 6 and the pipes, which is thus exerted on the surface 6a of the lips 6 and which would otherwise detach the lips from the outer surface of the connected pipes.

It should be noted in this regard that the compression of the lips 6 on the attached pipes, which thus prevents the lips from detaching from the outer surface of the pipes, becomes increasingly strong as the external pressure increases. It should also be noted that the operation of the composite sleeve in the case of a duct subjected to a raised external pressure, as has just been described, is applicable in similar fashion to the case of a duct in which the transported liquid undergoes a pressure reduction. In this case, the orifices 16 allow the annular space 14 to draw in the air and/or liquids circulating outside of the duct.

Figure 10:
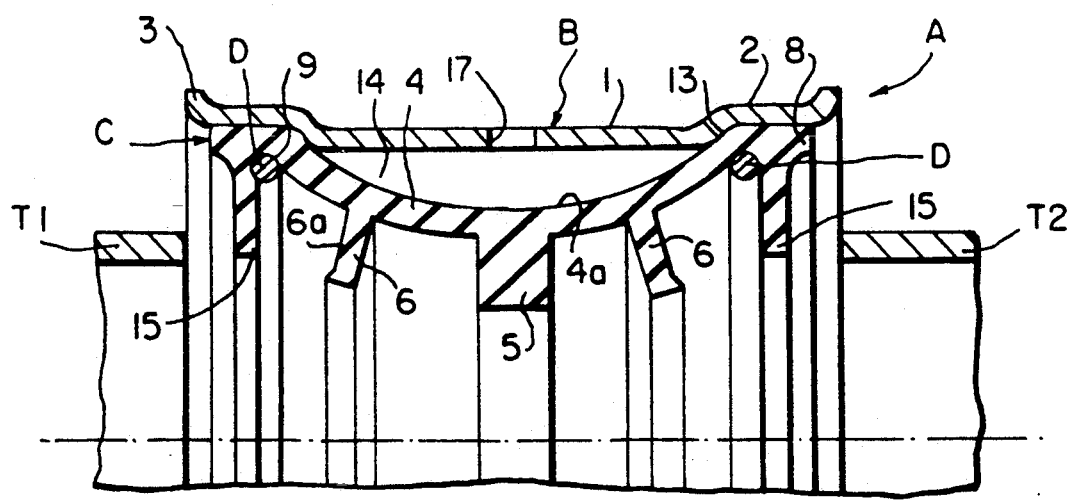
FIG. 10 is a view analogous to that in FIG. 3, according to a third embodiment of the invention.

The composite sleeve A according to the variant illustrated in FIG. 10 differs from that of FIGS. 7 to 9 only in that the channelling means now comprises at least one orifice 17 cutting through the tubular body 1 of the rigid ring B, thereby creating a passage between the annular space 14 and the outside of the sleeve. This channelling means preferably comprises a series of orifices 17 distributed over the periphery of the rigid ring B, through whose tubular body they penetrate.

As regards the imperviousness to internal and external fluid pressures according to this variant (FIG. 10), the operating principle is identical to that previously described with respect to the embodiment in FIGS. 7 to 9.

Accordingly, the orifices 16 and 17 respectively, cut in the body of the collar C and of the ring B, in conjunction with the annular space 14 and the presence of the tapered annular sealing lips 6, confer on the composite sleeve operating dynamics which make it possible to provide complete imperviousness to both internal and external fluid pressures acting on the attached pipes. These two variants make it possible, moreover, to achieve performance levels essentially identical to those of the sleeve of FIGS. 1 to 6 and to benefit from the same advantages as those provided by this embodiment, thereby addressing the technical problems for which the present invention has been offered as a solution.

We claim:

1. A composite coupling sleeve (A), comprising:
   a) a rigid outer ring (B),
   b) a flexible, elastic, evertable sealing collar (C) coaxially disposed inside said ring, enclosed thereby, and having a circular median projection (5) designed to act as a stop between smooth ends of two pipes (T1, T2) to be joined, and
   c) a pair of toric retaining rings (D) individually pressing said collar internally against said ring at contact zones (13) in proximity to opposite ends of said outer ring to thereby secure said collar to said ring,
   d) wherein, intermediate said contact zones, an annular space (14) is defined between the collar and the outer ring to enable the coupling of pipes over a wide range of diameters.

2. A composite sleeve according to claim 1, wherein a tubular body (4) of the collar curves toward an axis of the collar to define said annular space.

3. A composite coupling sleeve (A) comprising: a rigid outer ring (B), and a flexible, elastic, evertable sealing collar (C) coaxially disposed inside said ring, enclosed thereby, and having a circular median projection (5) designed to act as a stop between smooth ends of two pipes (T1, T2) to be joined, wherein said collar (C) is attached to said ring by a pair of toric retaining rings (D) pressing said collar internally against said ring in contact zones (13) in proximity to opposite ends of said outer ring, wherein, intermediate said contact zones, an annular space (14 is defined between the collar and the outer ring, and wherein the outer ring comprises a tubular body (1) having end extensions (2) whose inner diameters are greater than the diameter of said tubular body (1), said extensions (2) flaring to the outside so as to form flanges or mouth pieces (3).

4. A composite sleeve according to claim 3, wherein the collar defines, internally, symmetrically, and outwardly from either side of the median stop (5), a tapered annular sealing ring (6) which converges toward the collar axis and toward said median stop; a trapezoidal projection (8) having a median section in the shape of a rectangular trapezoid and which forms, by means of a right-angled side and in conjunction with a tubular body (4) of the collar, a recess (9) for receiving a toric retaining ring; and a long, flexible annular sealing lip (11) which can be folded back over the extension (2) and the flange (3) of the outer ring (B) and which can be thereafter unfolded against the outer surface of a pipe to be fitted.

5. A composite sleeve according to claim 4, wherein, between each trapezoidal projection (8) and each long lip (11), a circular groove (10) for enhancing the flexibility of the long sealing lip (11) is defined.

6. A composite sleeve according to claim 4, wherein inner ends of the sealing rings and lips (6, 11) define circular crests or tips (7, 12) designed to press down against the outer surfaces of the pipes.

7. A composite coupling sleeve (A) comprising: a rigid outer ring (B), and a flexible, elastic, evertable sealing collar (C) coaxially disposed inside said ring, enclosed thereby, and having a circular median projection (5) designed to act as a stop between smooth ends of two pipes (T1, T2) to be joined, wherein said collar (C) is attached to said ring by a pair of toric retaining rings (D) pressing said collar internally against said ring in contact zones (13) in proximity to opposite ends of said outer ring, wherein, intermediate said contact zones, an annular space (14) is defined between the collar and the outer ring, and wherein said sleeve includes channelling means (16, 17) for allowing exterior fluids to penetrate into the annular space (14).

8. A composite sleeve according to claim 7, wherein said collar defines, internally, symmetrically, and outwardly from either side of the median stop (5), a tapered annular sealing lip (6) converging toward the collar axis and toward said median stop, and a trapezoidal projection (8) having a median section shaped like a rectangular trapezoid and which forms, by means of a right-angled side and in conjunction with a tubular body (4) of the collar, a groove (9) for receiving a toric retaining ring, said trapezoidal projection being extended toward the inside of the collar by an annular radial or tapered protective lip (15).

9. A composite sleeve according to claim 8, wherein the channelling means is formed by at least one orifice (16) which passes through the tubular body of the collar, said orifice (16) being located between the groove and the tapered annular sealing lip.

10. A composite sleeve according to claim 9, wherein the channelling means comprises, on either side of the median stop (5), a series of orifices (16) distributed over the periphery of the collar.

11. A composite sleeve according to claim 8, wherein the channelling means is formed by at least one orifice (17) penetrating through a tubular body (1) of the rigid outer ring (B), thereby creating a passage between the annular space (14) and the outside of the sleeve.

12. A composite sleeve according to claim 11, wherein the channelling means comprises a series of orifices distributed over the periphery of the rigid outer ring.

* * * * *